(12) United States Patent
Zhou

(10) Patent No.: US 12,433,256 B2
(45) Date of Patent: Oct. 7, 2025

(54) WEARABLE PET HEALTH DETECTION DEVICE

(71) Applicant: Shenzhen Zheyin Intelligent Technology Co., Ltd., Shenzhen (CN)

(72) Inventor: Yongkai Zhou, Shenzhen (CN)

(73) Assignee: Shenzhen Zheyin Intelligent Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/390,131

(22) Filed: Dec. 20, 2023

(65) Prior Publication Data
US 2025/0204497 A1    Jun. 26, 2025

(51) Int. Cl.
*A01K 29/00*    (2006.01)
*A01K 15/02*    (2006.01)
*A01K 27/00*    (2006.01)

(52) U.S. Cl.
CPC .......... *A01K 29/005* (2013.01); *A01K 27/001* (2013.01); *A01K 27/006* (2013.01); *A01K 15/022* (2013.01)

(58) Field of Classification Search
CPC .. A01K 29/005; A01K 27/001; A01K 27/006; A01K 15/022
See application file for complete search history.

(56) References Cited

U.S. PATENT DOCUMENTS

| | | | | |
|---|---|---|---|---|
| 4,947,795 A * | 8/1990 | Farkas | .................. | A01K 27/009 119/718 |
| 5,243,457 A * | 9/1993 | Spencer | ............... | A01K 27/006 250/484.2 |
| 5,322,037 A * | 6/1994 | Tozawa | ................ | A01K 27/001 119/863 |
| 5,367,987 A * | 11/1994 | Lin | ....................... | A01K 27/006 119/858 |
| 5,601,054 A * | 2/1997 | So | ......................... | A01K 27/009 119/908 |
| 5,653,197 A * | 8/1997 | Massaro | .............. | A01K 27/006 119/858 |
| 5,815,077 A * | 9/1998 | Christiansen | ........ | A01K 15/021 455/100 |
| 5,913,284 A * | 6/1999 | Van Curen | .......... | A01K 27/009 119/718 |
| 8,803,692 B2 * | 8/2014 | Goetzl | ................. | A01K 27/009 340/573.3 |
| 12,219,933 B1 * | 2/2025 | Anderton | ............. | A01K 27/009 |
| 2014/0123912 A1 * | 5/2014 | Menkes | ............... | A61B 5/0022 119/859 |

(Continued)

*Primary Examiner* — William L Gmoser
(74) *Attorney, Agent, or Firm* — JEEN IP LAW, LLC

(57) ABSTRACT

The present disclosure provides a wearable pet health detection device including a fixed belt, a detection device body is fixed at a pet's neck position driven by the fixed belt, a splicing component is provided with a clamp component through a slot, a bottom of the clamp component is provided with a round hole, a round rod is inserted in the round hole, an outer of the round rod is covered with a spring, a bottom end of the round rod runs through the splicing component and is fixedly connected to a control component. When charging, a limit component is directly pulled to have a displacement, a fixation with a clamp board component is detached, an insertion rod assembly is driven to pull out, the detection device body is pulled to move, and an inner rod assembly is separated from an inner of a connection groove.

10 Claims, 8 Drawing Sheets

(56) References Cited

U.S. PATENT DOCUMENTS

| | | | | |
|---|---|---|---|---|
| 2018/0249680 | A1* | 9/2018 | Van Curen | A01K 15/022 |
| 2022/0151207 | A1* | 5/2022 | Mott | A01K 29/005 |
| 2022/0287577 | A1* | 9/2022 | Huber | A61B 5/02438 |
| 2022/0394955 | A1* | 12/2022 | Van Curen | A01K 15/023 |
| 2023/0301532 | A1* | 9/2023 | Huber | A61B 5/02438 |
| 2023/0309509 | A1* | 10/2023 | Gopinath | A01K 27/009 119/51.02 |
| 2023/0345907 | A1* | 11/2023 | Smith | A01K 27/001 |
| 2023/0389522 | A1* | 12/2023 | Koo | A01K 27/00 |
| 2024/0057554 | A1* | 2/2024 | Williams | A01K 29/005 |
| 2024/0156059 | A1* | 5/2024 | Hill | A01K 29/005 |
| 2024/0196863 | A1* | 6/2024 | Wernimont | A01K 27/009 |
| 2024/0268353 | A1* | 8/2024 | Young | A01K 27/001 |
| 2024/0334906 | A1* | 10/2024 | Arumugham | A01K 15/022 |
| 2024/0381847 | A1* | 11/2024 | Heine | A01K 29/005 |
| 2025/0030258 | A1* | 1/2025 | Lin | H02J 7/0048 |

* cited by examiner

WEARABLE PET HEALTH DETECTION DEVICE

TECHNICAL FIELD

The present disclosure relates to the field of pet health technologies, and in particular, to a wearable pet health detection device.

BACKGROUND

With people's love for pets, pet health is also an attention focus. People can only judge the health status of pets based on external characteristics such as their mental state, and cannot understand their health status from their physiological data. Pets can only be discovered by their owners after falling ill, and cannot be prevented in a timely manner. They can only go to a pet hospital for treatment, which will incur expensive diagnostic and treatment costs. Nowadays, there are some health detection devices worn around the neck of pets on the market, which are used to monitor their physical health in real-time. However, the commonly used wearable pet health detection devices on the market have smaller internal batteries and require frequent charging. When charging, the fixed belts need to be dismantled together, which is relatively cumbersome and laborious. Moreover, during the process of wearing the health detection device, when pets are playing, crawling, and rolling, it is easy to cause the fixed belt to loosen and detach, which may lead to the loss of the detection devices. When raising dogs, an electric shock stop barking device is usually installed on the detection device. When a dog barks, the electric shock stop barking is automatically triggered. However, sometimes the barking sound is not loud, the use of the electric shock device can affect the dog's mental state and physical health.

SUMMARY

In view of this, the present disclosure provides a wearable pet health detection device to solve the problem of common wearable pet health detection devices, where a battery inside the detection device is small and which requires frequent charging, and when charging, the fixed belt needs to be disassembled together, it is relatively cumbersome and laborious.

The present disclosure provides a wearable pet health detection device, including:

a detection device body; a top end of the detection device body is connected to an inner rod assembly through a connection groove. An inner of the inner rod assembly is provided with a circular hole for fixation, two sides of the inner rod assembly is provided with a fixed component through a side groove; the fixed component is in an U-shape and is made of a flexible rubber material, two sides of a bottom of the fixed component are inclined, a top end and an outer side of the fixed component are both provided with a curved groove;

a fixed belt, which is in a circular shape, the detection device body is fixed at a pet's neck position driven by the fixed belt; a bottom of the fixed belt is provided with two square grooves, a left end of the fixed belt is fixedly connected to a splicing component, the splicing component is provided with a clamp component through the slot, the clamp component is made of metal; a top end of clamp component is provided with evenly arranged wedge-shaped grooves, a bottom of the clamp component is provided with a round hole, and a round rod is inserted in the round hole; an outer of the round rod is covered with a spring, a bottom end of the round rod runs through the splicing component and is fixedly connected to a control component, two sides of a top end of the control component are inclined;

a controller, which is provided in the detection device body, the controller is connected to a storage battery through a circuit, and the storage battery is connected to a charging port, the charging port is provided at a bottom of the detection device body, the controller is connected to a judgment component through a circuit, and the judgment module is connected to a wireless transmitter through a circuit, the controller is connected to a wireless transmitter through a circuit, the wireless transmitter is connected to a user's mobile phone through a wireless network, the judgment component is connected to a shock absorber through a circuit, and the shock absorber is provided on the detection device body and passes through the square groove of the fixed belt.

In an embodiment of the present disclosure, a top end of the detection device body is provided with a connection slot, the connection slot is in rectangular shape, an outer of the connection slot is provided with a circular hole, and when the inner rod assembly is inserted into the connection slot, a position of the round hole is the same as a position of the circular hole, a bottom of a rear end of the detection device body is fixed with a clamp board component that is made of an elastic plastic; a top end of the clamp board component is provided with a protrusion, an upper of the clamp board component is clamped to a limit component, and a front end of the limit component is fixed with an insertion rod assembly that is in a cylindrical shape; the insertion rod assembly is inserted into the circular hole and the round hole, and the inner rod assembly is fixed; two sides of the inner rod assembly are respectively provided with a U-shaped side groove, and an inner of the side groove is bonded and fixed with the fixed component, a top end of the inner rod assembly is fixedly connected to the connection component, and the connection component is rotatably connected to a bottom end of the fixed belt.

In an embodiment of the present disclosure, an inner of the fixed belt is bonded and fixed with four flexible contacts made of a rubber material, and an outer side of each contact is provided with two arc-shaped grooves, an inner side of each contact is fixedly provided with evenly arranged fixed teeth, and the fixed teeth are made of a flexible rubber material and are in contact with pet hair; the inner side of each contact is provided with two auxiliary slots in an arc shape, a cross-section of the auxiliary slot is V-shaped, the splicing component is made of metal and is internally provided with a T-shaped slot, and the clamp component is in the slot and can move up and down; a right end of the fixed belt is fixedly connected to an insertion component that is made of metal material, a left end of the insertion component is U-shaped and is inserted into an inner of the slot; an inner of a top end of the insertion component is provided with evenly arranged wedge-shaped blocks, which are clamped with the wedge-shaped groove of the clamp component, and the clamp component is inserted in the insertion component.

In an embodiment of the present disclosure, the controller is connected to a temperature sensor through a circuit, the temperature sensor is provided on a rear end of the detection device body, the controller is connected to a heart rate sensor through a circuit, and the heart rate sensor is provided in the detection device body; the controller is connected to a blood pressure sensor through a circuit, the blood pressure sensor is provided in the detection device body, and the controller is connected to a position sensor through a circuit; the controller is connected to sound and light alarm through a circuit, the sound and light alarm is provided at a front end of the detection device body; the controller is connected to a sound recognition component through a circuit, and the sound recognition component is provided at the front end of the detection device body, the sound recognition component is connected to the judgment component through a circuit.

The present disclosure provides a wearable pet health detection device, which has the following beneficial effects:

1. when charging, the limit component is directly to be pulled and have a displacement, the fixation with the clamp component is detached, the insertion rod assembly is driven to be pulled out, the detection device body is pulled to move, which causes the inner rod assembly to be detached from the inner of the connection slot, renders that it is convenient to separate and disassemble the detection device body, facilitates charging and cleaning, and avoids disassembling the fixed belt;
2. after the fixed belt is fixed, the spring continuously pushes the clamp component to fix, and the control component used to release the fixation is located on the inner side of the fixed belt, so that when the pet crawls and rolls, it will not cause the control component to have displacement, which avoids the automatic loosening and opening of the fixed belt;
3. before using, a user sets the trigger sound decibel size through his mobile phone, so that when the dog barks, the sound is transmitted to the controller and judgment component. The judgment component compares the recognized sound decibel value with the set sound decibel value. If the set sound decibel value is not exceeded, no response will be made. If the set sound decibel value is exceeded, an electric shock device will be triggered to stop the dog barking through the electric shock device, which avoids triggering the electric shock when the dog makes small barks.

BRIEF DESCRIPTION OF DRAWINGS

In order to provide a clearer explanation of the technical solution of the embodiments of the present disclosure, the drawings of the embodiments will be briefly introduced below.

The drawings in the following description only relate to some embodiments of the present disclosure, rather than limiting it. In the drawings.

Figure 1:
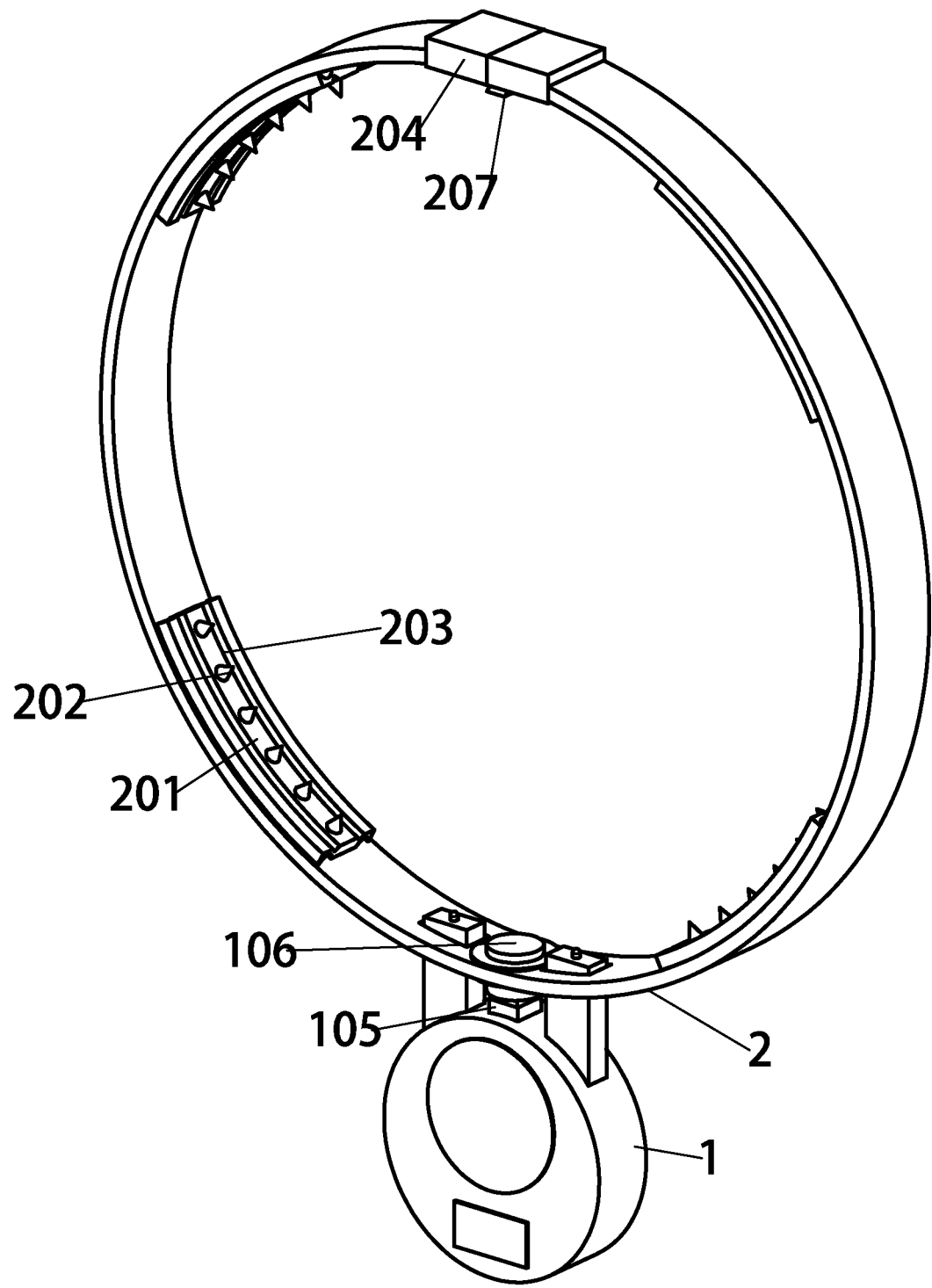
FIG. 1 is a perspective structural schematic diagram of a detection device according to an embodiment of the present disclosure.
Figure 2:
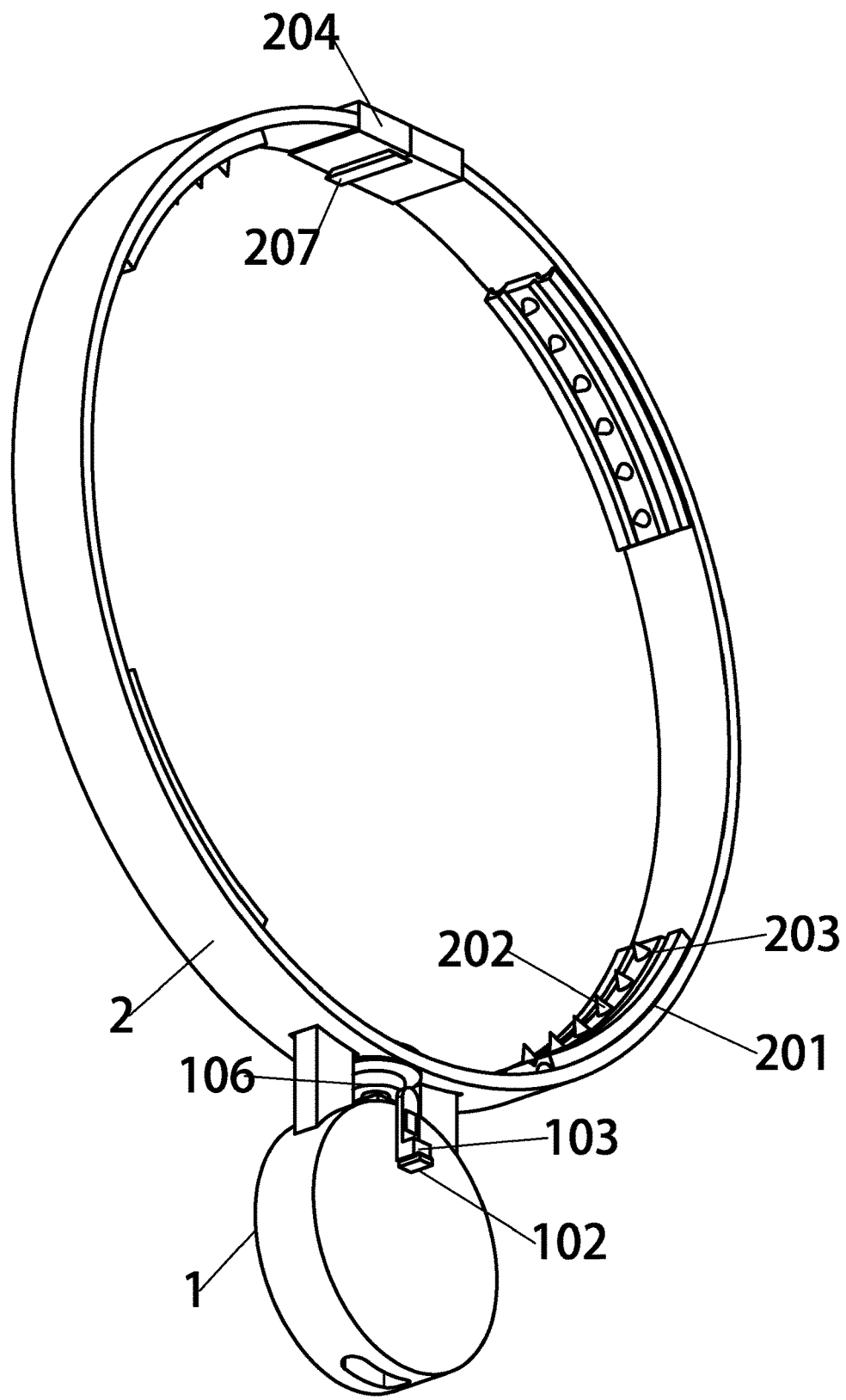
FIG. 2 is a structural schematic diagram of a top view of the detection device according to an embodiment of the present disclosure.
Figure 3:
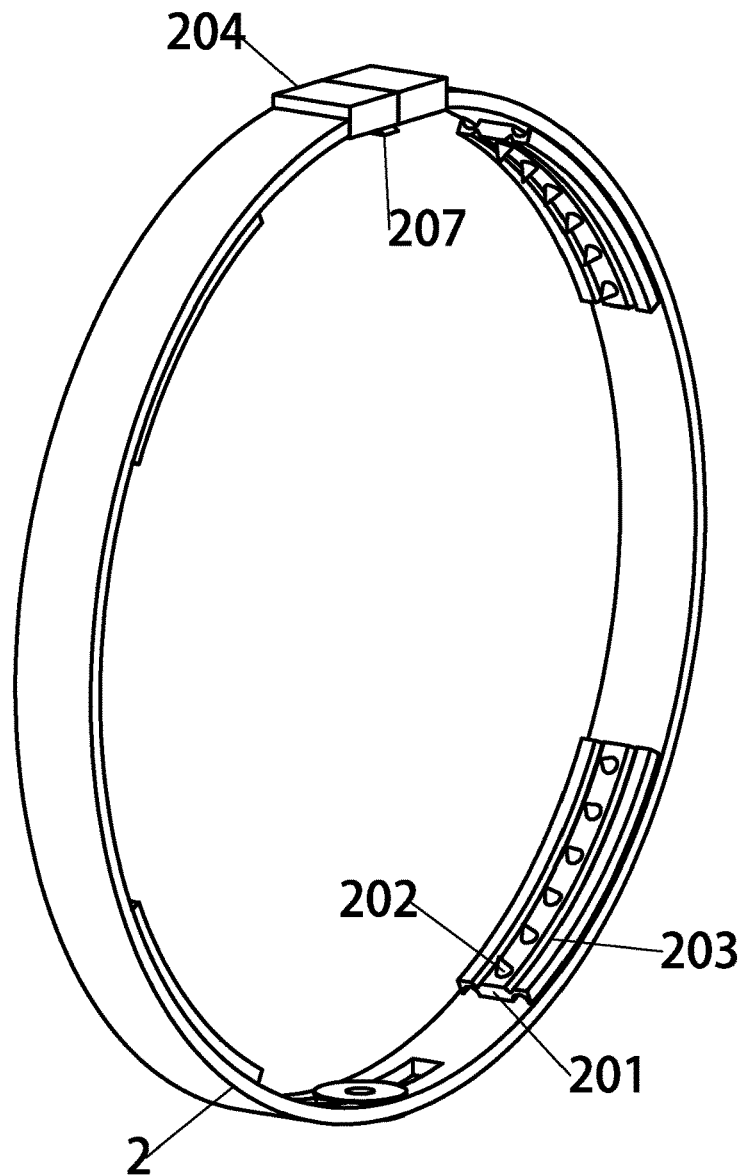
FIG. 3 is a perspective schematic diagram of a decomposed structure of the detection device according to an embodiment of the present disclosure.
Figure 3:
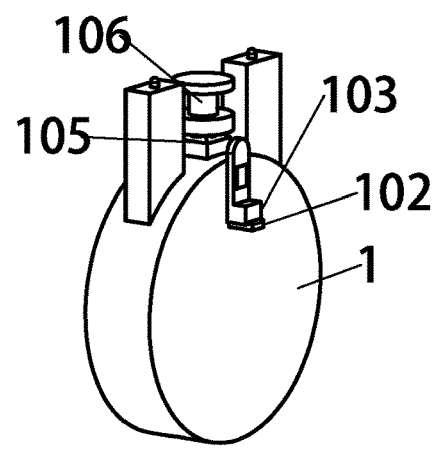
Figure 4:
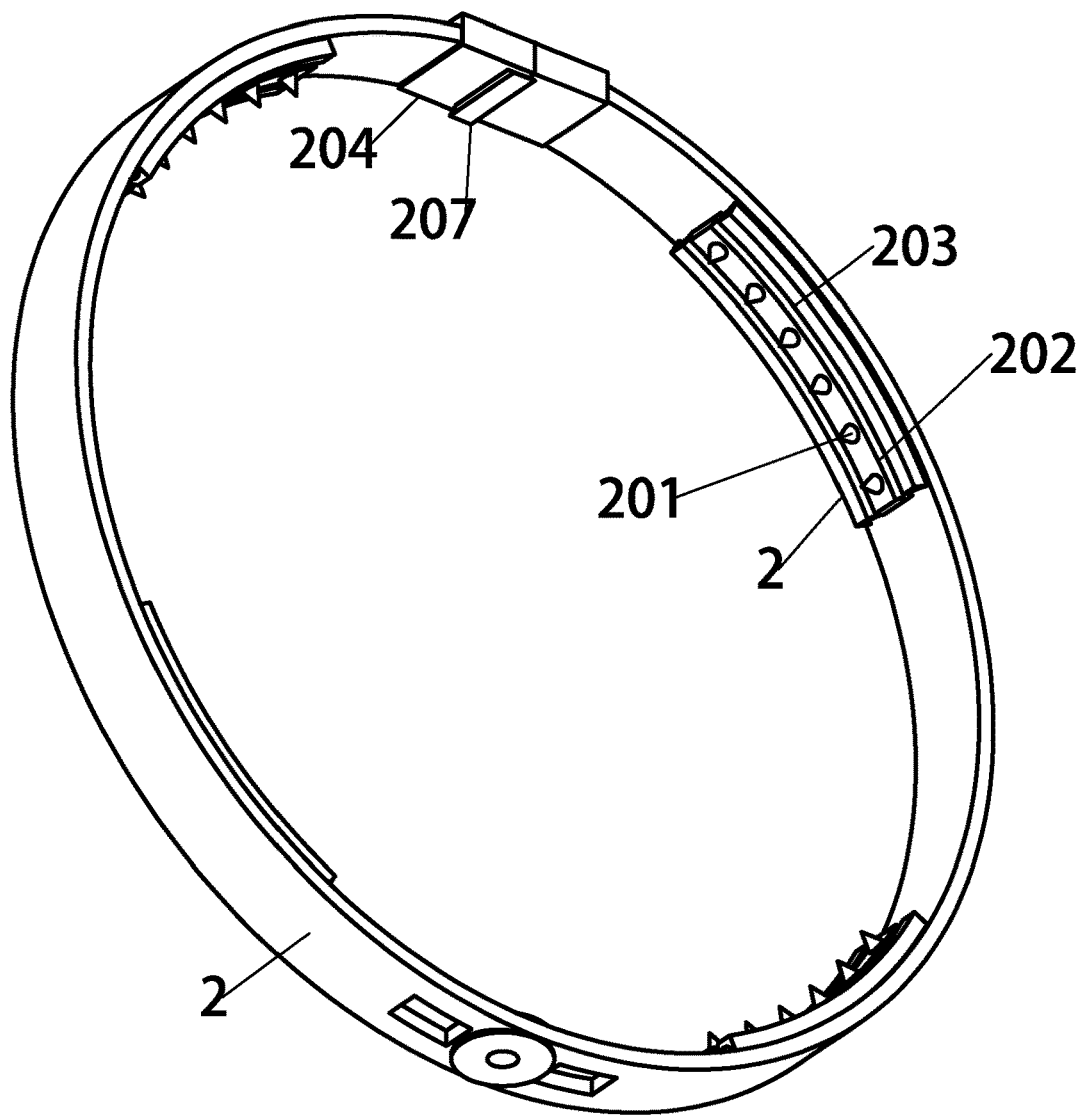
FIG. 4 is a schematic diagram of the decomposed structure in top view of the detection device according to the embodiment of the present disclosure.
Figure 4:
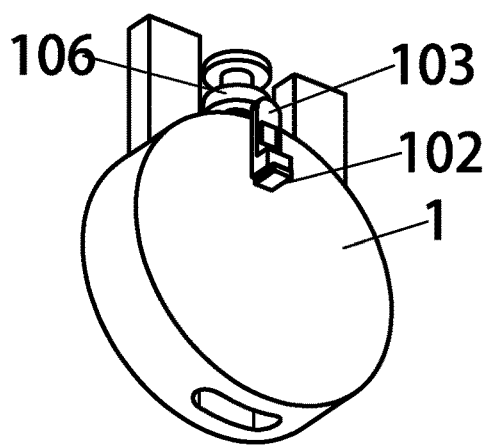

Numeral reference: 1. detection device body; 101. connection slot; 102. clamp board component; 103. limit component; 104. insertion rod assembly; 105. inner rod assembly; 106. connection component; 107. side groove; 108. fixed component;

2. fixed belt; 201. contact; 202. fixed teeth; 203. auxiliary slot; 204. splicing component; 205. slot; 206. clamp component; 207. control component; 208. insertion component;

3. controller; 301. temperature sensor; 302. heart rate sensor; 303. blood pressure sensor; 304. position sensor; 305. sound and light alarm; 306. sound recognition component; 307. judgment component; 308. shock absorber.

DESCRIPTION OF EMBODIMENTS

The following will provide a further detailed description of the embodiments of the present disclosure in combination with the drawings and embodiments.

Embodiment 1: Please Refer to FIGS. 1 to 8

The present disclosure provides a wearable pet health detection device, which includes a detection device body 1; a top end of the detection device body 1 is connected to an inner rod assembly 105 through a connection slot 101. An inner of the inner rod assembly 105 is provided with a circular hole for fixation, i.e., for inserting the insertion rod assembly 104 for a limit fixation. A fixed component 108 is provided on two sides of the inner rod assembly 105 through a side groove 107, and the inner rod assembly 105 is clamped into the detection device body 1. The fixed component 108 is U-shaped and made of a flexible rubber material, two sides of a bottom of the fixed component 108 are inclined and a top end and an outer side of the fixed component 108 are both provided with a curved groove, which are inserted into the connection slot 101 for anti-skid limit fixation and it is convenient to limit the detection device body 1, facilitates a quick disassembly of the detection device body 1, and facilitates charging and cleaning. The wearable pet health detection device further includes a fixed belt 2, which is in a circular shape, the detection device body 1 is fixed at a pet's neck position driven by the fixed belt. A bottom of the fixed belt 2 is provided with two square grooves to allow a shock absorber 308 to pass through. A left end of the fixed belt 2 is fixedly connected to a splicing component 204, the splicing component 204 is provided with a clamp component 206 through a slot 205, the clamp component 206 is made of metal. A top end of the clamp component 206 is provided with evenly arranged wedge-shaped groove, the wedge-shaped block used to clamp and fix the insertion component 208 is provided with a round hole at a bottom of the clamp component 206, and a round rod is inserted inside the round hole. An outer of the round rod is covered with a spring, which continuously pushes the clamp component 206 to fix. A bottom end of the round rod runs through the splicing component 204 and is fixedly connected to the control component 207. Two sides of a top end of the control component 207 are inclined, which facilitates the displacement of the control component 207. At the same time, the control component 207 is located on an inner side of the fixed belt 2, which avoids causing the fixed belt 2 to automatically open when the dog is touching, crawling, rolling, and hitting. The wearable pet health detection device also includes a controller 3, which is provided in the detection device body 1. The controller 3 is connected to a storage battery through a circuit, and the storage battery is connected to a charging port. The charging port is provided at a bottom of the detection device body 1. The controller 3 is connected to a judgment component 307 through a circuit to determine the sound level. The judgment component 307 is also connected to a wireless transmitter through a circuit, and controller 3 is connected to the wireless transmitter through a circuit. The wireless transmitter is connected to a user's mobile phone through a wireless network, which can transmit the detected physiological information of the pet to the user's mobile phone. At the same time, the decibel value of the sound can be set through the mobile phone. The judgment component 307 is connected to a shock absorber 308 through a circuit, and the shock absorber 308 is provided on the detection device body 1 and passes through the square groove of the fixed belt 2, which facilitates a contact with the pet.

Figure 5:
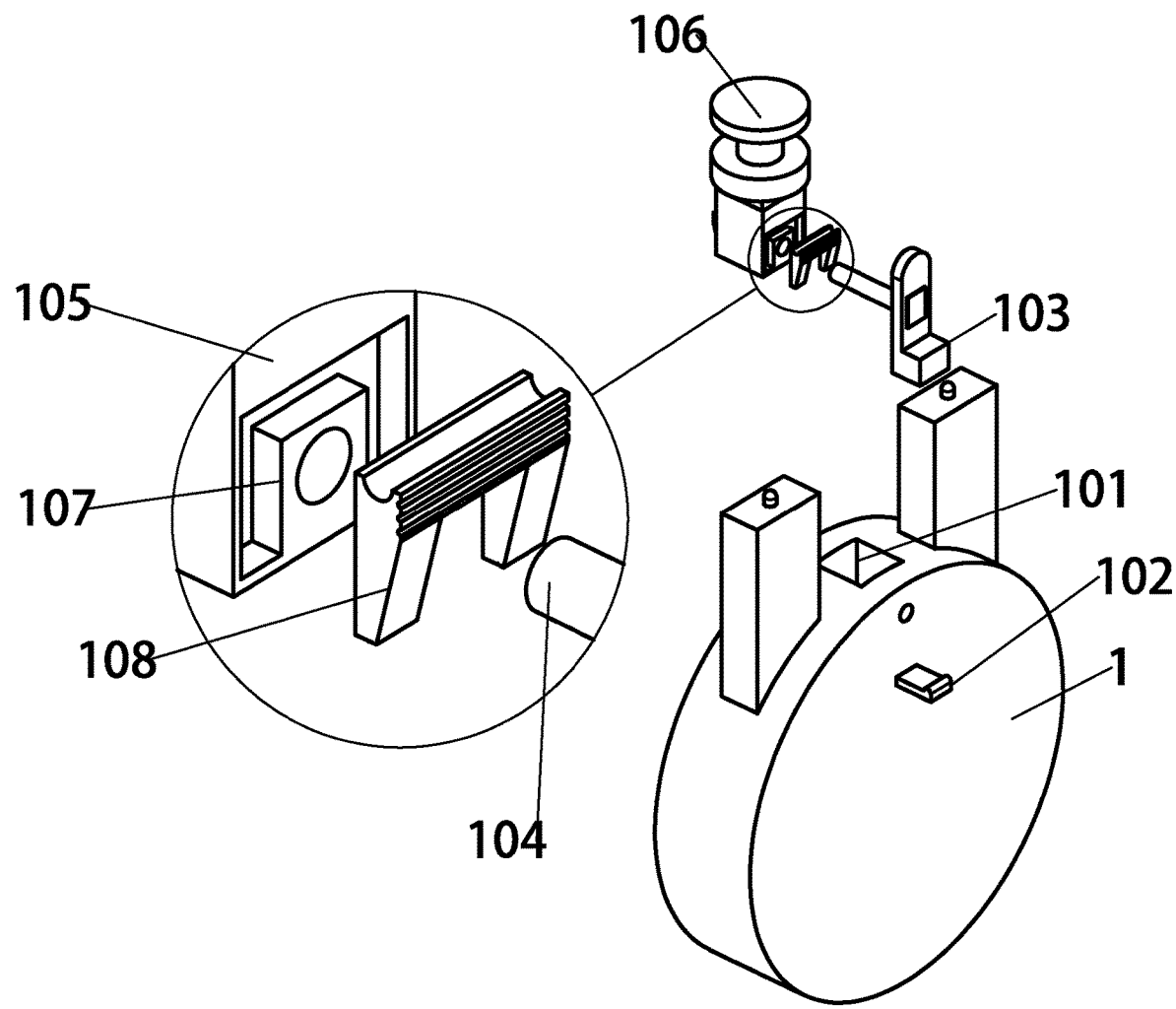
FIG. 5 is a schematic diagram of a local decomposition perspective structure and local enlarged structure of the detection device according to the embodiment of the present disclosure.

Referring to FIG. 5, a top end of the detection device body 1 is provided with a connection slot 101 for inserting and fixing the inner rod assembly 105. The connection slot 101 is in a rectangular shape, an outer of the connection slot 101 is provided with a circular hole for inserting and fixing the insertion rod assembly 104. When the inner rod assembly 105 is inserted into the connection slot 101, a position of the round hole is the same as a position of the circular hole, which facilitates an insertion of the insertion rod assembly 104. A bottom of a rear end of the detection device body 1 is fixed with a clamp board component 102 that is made of an elastic plastic to clamp and fix a limit component 103; a top end of the clamp board component 102 is provided with a protrusion, an upper of the clamp board component is clamped to the limit component 103. A front end of the limit component 103 is fixed with an insertion rod assembly 104 that is in a cylindrical shape. The insertion rod assembly 104 is inserted into both the circular hole and the round hole, and the inner rod assembly 105 is fixed to avoid detachment of the inner rod assembly 105; two sides of the inner rod assembly 105 are respectively provided with a U-shaped side groove 107, an inner of the side groove 107 is bonded and fixed with the fixed component 108. The fixed component 108 is used for installation, and a top end of the inner rod assembly 105 is fixedly connected to a connection component 106. The connection component 106 is rotatably connected to a bottom end of the fixed belt 2, the inner rod assembly 105 is driven to be connected to the fixed belt 2.

Figure 6:
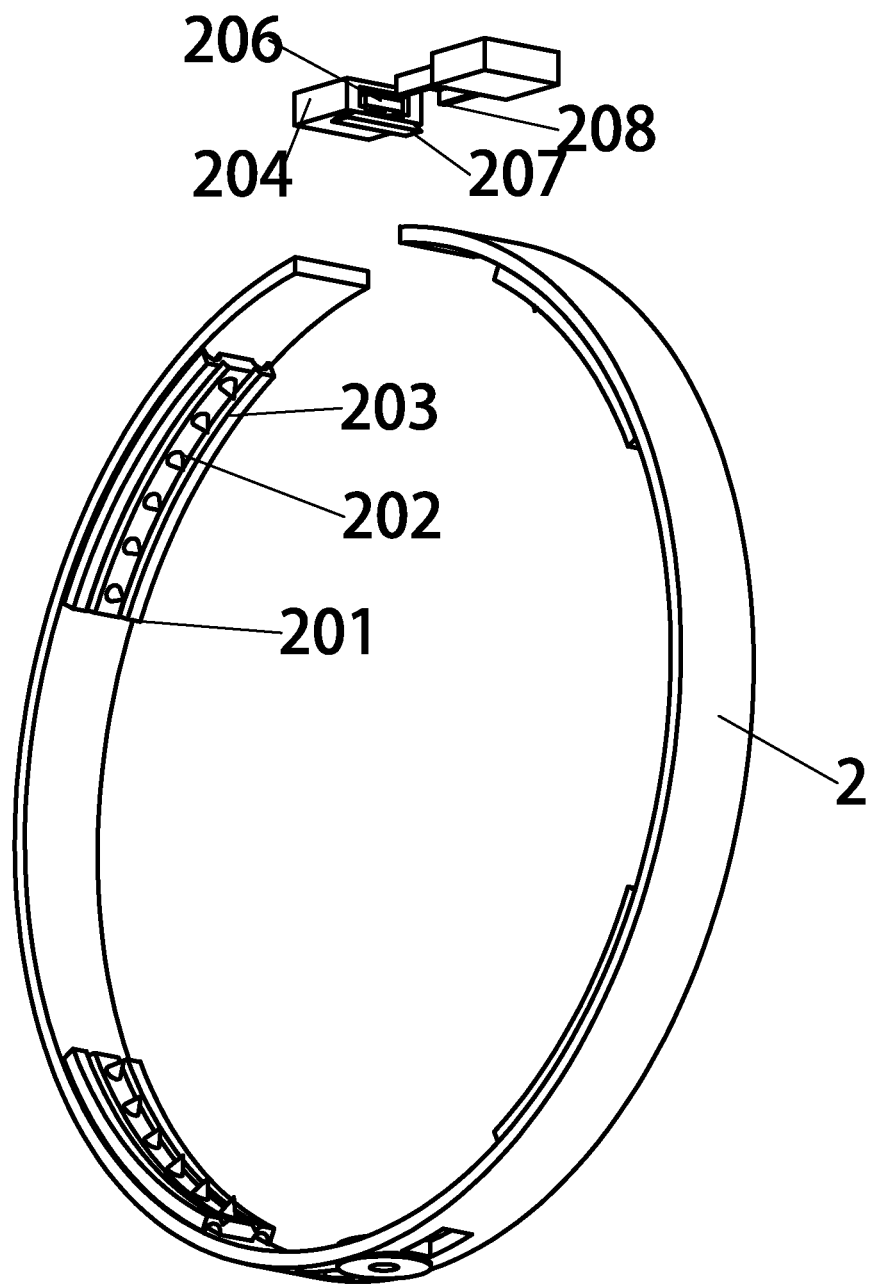
FIG. 6 is a perspective schematic diagram of a decomposition structure of a fixed belt of the detection device according to an embodiment of the present disclosure.
Figure 7:
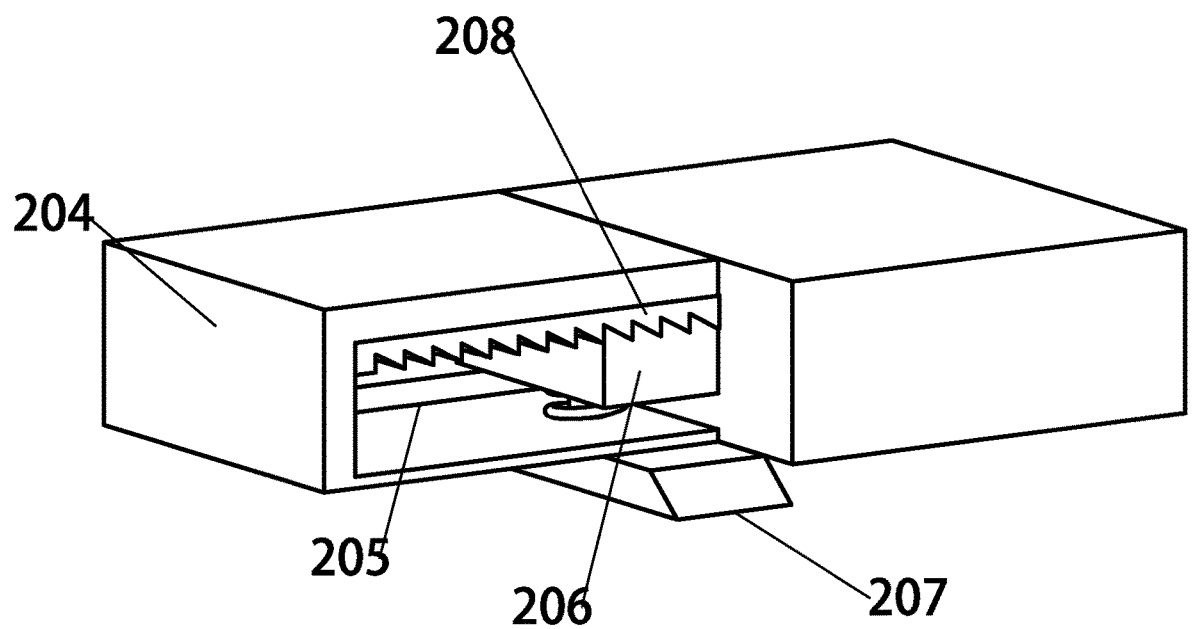
FIG. 7 is a schematic diagram of a local cross-sectional perspective structure of a splicing component of the detection device according to an embodiment of the present disclosure.

Referring to FIGS. 6 and 7, an inner of the fixed belt is bonded and fixed with four flexible contacts 201 made of a rubber material 2, which are in non-slip contact with pet hair to prevent excessive shaking of the fixed belt 2 when the pet is running. An outer side of each contact 201 is provide with two arc-shaped grooves to improve the flexibility of the contact 201. An inner side of each contact 201 is fixedly provided with evenly arranged fixed teeth 202, and the fixed teeth 202 are made of a flexible rubber material and are in contact with pet hair. The inner side of each contact 201 is provided with two auxiliary slots 203 in an arc shape, a cross-section of the auxiliary slot 203 is V-shaped with an auxiliary anti-skid limit function. The splicing component 204 is made of metal and is internally provided with a T-shaped slot 205, which allows a left end of the insertion component 208 to be inserted and fixed, and the clamp component 206 is displaced up and down inside the slot 205; a right end of the fixed belt 2 is fixedly connected to an insertion component 208 that is made of metal. A left end of the insertion component 208 is U-shaped and is inserted into an inner of the slot 205. An inner of a top end of the insertion component 208 is provided with evenly arranged wedge-shaped blocks, which are clamped with the wedge-shaped groove of the clamp component 206 to fix the fixed belt 2 for use together. The clamp component 206 is inserted in the insertion component 208.

Figure 8:
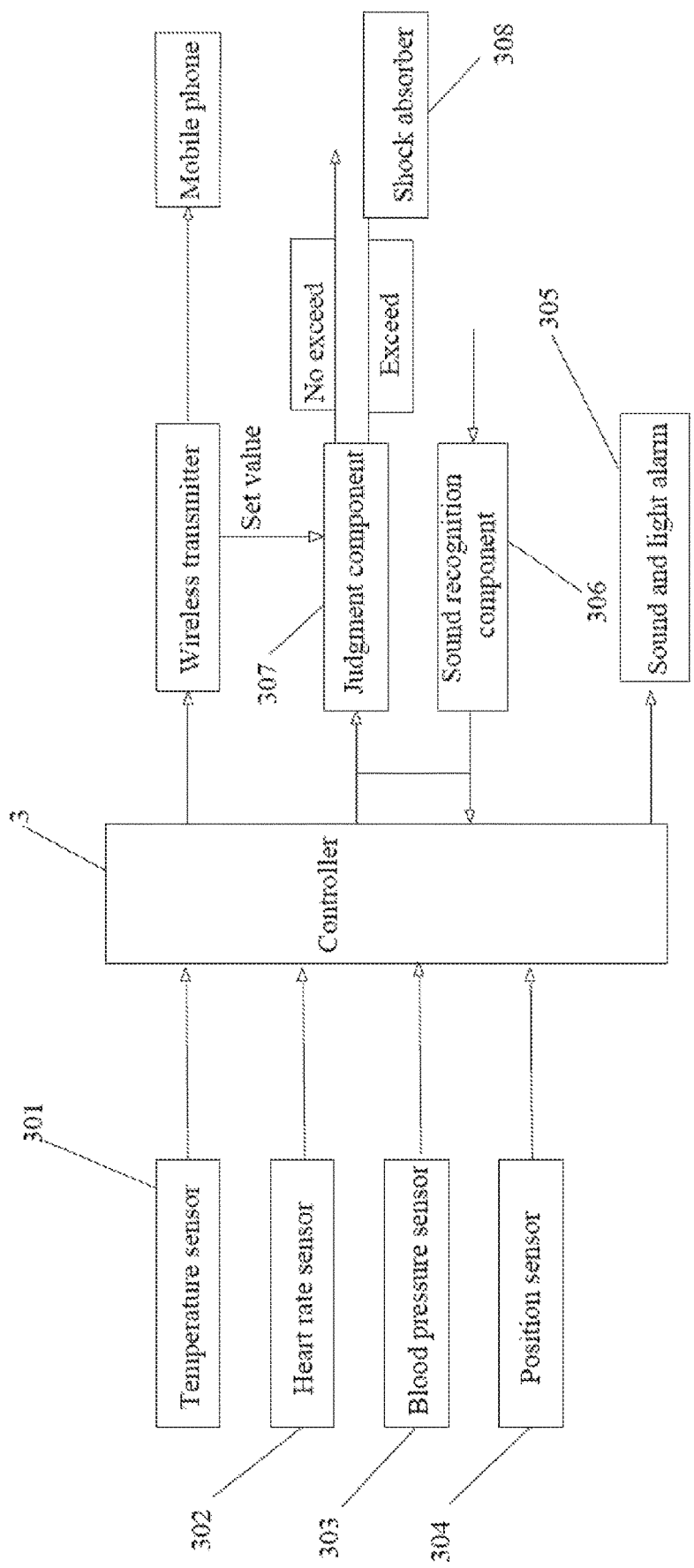
FIG. 8 is a block diagram of a health detection system module of the detection device according to an embodiment of the present disclosure.

Referring to FIG. 8, the controller 3 is connected to a temperature sensor 301 through a circuit to recognize the pet's body temperature. The temperature sensor 301 is provided on a rear end of the detection device body 1, the controller 3 is connected to a heart rate sensor 302 through a circuit to recognize the pet's heart rate. The information is then transmitted to the mobile phone. The heart rate sensor 302 is provided in the detection device body 1; the controller 3 is connected to the blood pressure sensor 303 through a circuit to identify pet blood pressure. The blood pressure sensor 303 is provided in the detection device body 1, and controller 3 is connected to a position sensor 304 through the circuit to locate the pet in real time, rendering it easy to quickly locate the lost pet; the controller 3 is connected to a sound and light alarm 305 through a circuit, rendering it convenient to emit sound and light information and search for pets. The sound and light alarm 305 is provided at a front end of the detection device body 1, the controller 3 is connected to a sound recognition component 306 through a circuit, the sound recognition component 306 is provided at the front end of the detection device body 1, and the sound recognition component 306 is connected to the judgment component 307 through a circuit to transmit a recognized sound decibel value to the judgment component 307.

The specific usage and function of this embodiment: In the present disclosure, the detection device body 1 is first charged, and then the sound values of the triggering shock absorber 308 are set through the user's mobile phone. The inner rod assembly 105 is controlled to be inserted into the connection slot 101, and the insertion rod assembly 104 is controlled to be inserted into both the circular hole and the round hole simultaneously. The inner rod assembly 105 is fixed by the fixed component 108 to prevent slipping. After the insertion of the insertion rod assembly 104, the limit component 103 is clamped with the clamp board component 102 to avoid loosening and detachment. Then, the detection device body 1 and the fixed belt 2 are controlled to be worn on the pet's neck, and the left end of the insertion component 208 is inserted into the slot 205. The spring continuously pushes the clamp component 206, which is clamped with the wedge blocks through the wedge groove to firmly fix the fixed belt 2 and ensure that the pet can securely wear the detection device body 1, during the wearing process, various sensors are used to send the physiological indicators of the pet to the user's phone. When the dog barks, the sound recognition component 306 recognizes the decibel size of the sound, and then transmits the sound to the controller 3 and the judgment component 307. The judgment component 307 compares the recognized decibel value of the sound with the set decibel value. If it does not exceed the set decibel value of the sound, no response will be made. If the set value is exceeded, the shock absorber 308 will be triggered to stop the dog barking through the shock absorber

308. When the dog barks small, the shock absorber 308 can be triggered. During charging, the limit component 103 can be directly pulled to have a displacement, which causes the insertion rod assembly 104 to be pulled out from the inside of the circular hole and the round hole. The detection device body 1 can be pulled to disassemble, and thereby causing the inner rod assembly 105 to detach from the inside of the connection slot 101, so that the fixed belt 2 does not need to be disassembled, it is convenient to remove the detection device body 1 for charging and cleaning. When the clamp component 206 firmly connects the fixed belt 2, the control component 207 is located on the inner side of the fixed belt 2, so that when the pet crawls and rolls, it will not cause the control component 207 to move, thereby avoiding the automatic loosening and opening of the fixed belt 2. When the fixed belt 2 needs to be removed, the control component 207 is directly pulled to move, the clamp component 206 is driven to move, then the insertion component 208 is pulled to detach from the inside of the slot 205 and quickly remove the fixed belt 2.

What is claimed is:

1. A wearable pet health detection device, comprising:
a detection device body (1); a top end of the detection device body (1) is connected to an inner rod assembly (105) through a connection slot (101), an inner side of the inner rod assembly (105) is provided with a round hole, two sides of the inner rod assembly (105) is provided with a fixed component (108) through a side groove (107), the fixed component (108) is in an U-shape and is made of a flexible rubber material, two sides of a bottom of the fixed component (108) are inclined, a top end and an outer side of the fixed component (108) are both provided with a curved groove;
a fixed belt (2), which is in a circular shape, the detection device body (1) is fixed at a pet's neck position driven by the fixed belt (2); a bottom of the fixed belt (2) is provided with two square grooves, a left end of the fixed belt (2) is fixedly connected to a splicing component (204), the splicing component (204) is provided with a clamp component (206) through a slot (205), the clamp component (206) is made of metal, a top end of the clamp component (206) is provided with evenly arranged wedge-shaped grooves, a bottom of the clamp component (206) is provided with a round hole, a round rod is inserted in the round hole; an outer of the round rod is covered with a spring; a bottom end of the round rod runs through the splicing component (204) and is fixedly connected to a control component (207), two sides of a top end of the control component (207) are inclined;
a controller (3), which is provided in the detection device body (1), the controller (3) is connected to a storage battery through a circuit, and the storage battery is connected to a charging port, the charging port is provided at a bottom of the detection device body (1), the controller (3) is connected to a judgment component (307) through a circuit, and the judgment component (307) is connected to a wireless transmitter through a circuit, the controller (3) is connected to the wireless transmitter through a circuit, and the wireless transmitter is connected to a user's mobile phone through a wireless network, the judgment component (307) is connected to a shock absorber (308) through a circuit, and the shock absorber (308) is provided on the detection device body (1) and passes through the square groove of the fixed belt (2).

2. The wearable pet health detection device according to claim 1, wherein the connection slot (101) is in a rectangular shape, an outer of the connection slot (101) is provided with a circular hole, and when the inner rod assembly (105) is inserted into the connection slot (101), a position of the round hole is the same as a position of the circular hole, a bottom of a rear end of the detection device body (1) is fixed with a clamp board component (102) that is made of an elastic plastic.

3. The wearable pet health detection device according to claim 2, wherein a top end of the clamp board component (102) is provided with a protrusion, an upper end of the clamp board component (102) is clamped to a limit component (103), and a front end of the limit component (103) is fixed with an insertion rod assembly (104) that is in a cylindrical shape; the insertion rod assembly (104) is inserted into the circular hole and the round hole, and the inner rod assembly (105) is fixed.

4. The wearable pet health detection device according to claim 3, wherein the side groove is a pair of U-shaped side groove (107); and an inner side of the side groove (107) is bonded and fixed with the fixed component (108), a top end of the inner rod assembly (105) is fixedly connected to a connection component (106), and the connection component (106) is rotatably connected to a bottom end of the fixed belt (2).

5. The wearable pet health detection device according to claim 1, wherein an inner side of the fixed belt (2) is bonded and fixed with four flexible contacts (201) made of a rubber material, and an outer side of each contact (201) is provided with two arc-shaped grooves, an inner side of each contact (201) is fixedly provided with evenly arranged fixed teeth (202), and the fixed teeth (202) are made of a flexible rubber material and are in contact with pet hair.

6. The wearable pet health detection device according to claim 5, wherein an inner side of each contact (201) is provided with two auxiliary slots (203) in an are shape, a cross-section of the auxiliary slot (203) is V-shaped, the splicing component (204) is made of metal and is internally provided with a T-shaped slot (205), and the clamp component (206) is in the slot (205) and can move up and down.

7. The wearable pet health detection device according to claim 6, wherein a right end of the fixed belt (2) is fixedly connected to an insertion component (208) that is made of metal material, a left end of the insertion component (208) is U-shaped and is inserted into an inner side of the slot (205), an inner side of a top end of the insertion component (208) is provided with evenly arranged wedge-shaped blocks, which are clamped with the wedge-shaped groove of the clamp component (206), the clamp component (206) is inserted in the insertion component (208).

8. The wearable pet health detection device according to claim 1, wherein the controller (3) is electrically connected to a temperature sensor (301), the temperature sensor (301) is provided on a rear end of the detection device body (1), the controller (3) is electrically connected to a heart rate sensor (302), and the heart rate sensor (302) is provided in the detection device body (1).

9. The wearable pet health detection device according to claim 1, wherein the controller (3) is electrically connected to a blood pressure sensor (303), the blood pressure sensor (303) is provided in the detection device body (1), and the controller (3) is electrically connected to a position sensor (304).

10. The wearable pet health detection device according to claim 1, wherein the controller (3) is electrically connected to a sound and light alarm (305), the sound and light alarm (305) is provided at a front end of the detection device body (1), the controller (3) is electrically connected to a sound recognition component (306), and the sound recognition component (306) is provided at the front end of the detection device body (1), the sound recognition component (306) is electrically connected to the judgment component (307).

* * * * *